(12) United States Patent
Hughes et al.

(10) Patent No.: US 11,412,013 B2
(45) Date of Patent: Aug. 9, 2022

(54) SYSTEM AND METHOD FOR IMPLEMENTING VIDEO SOFT PHONE APPLICATIONS

(71) Applicant: JPMorgan Chase Bank, N.A., New York, NY (US)

(72) Inventors: Stephen A. Hughes, Sidcup (GB); Suresh Thankappan, Shrewsbury, MA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/987,635

(22) Filed: Aug. 7, 2020

(65) Prior Publication Data
US 2021/0044634 A1    Feb. 11, 2021

Related U.S. Application Data

(60) Provisional application No. 62/883,892, filed on Aug. 7, 2019.

(51) Int. Cl.
| | | |
|---|---|---|
| *H04L 65/403* | (2022.01) | |
| *H04L 67/10* | (2022.01) | |
| *H04L 67/02* | (2022.01) | |
| *H04L 67/131* | (2022.01) | |
| *H04L 67/133* | (2022.01) | |
| *H04L 9/40* | (2022.01) | |

(52) U.S. Cl.
CPC ............ *H04L 65/403* (2013.01); *H04L 63/08* (2013.01); *H04L 67/02* (2013.01); *H04L 67/10* (2013.01); *H04L 67/38* (2013.01); *H04L 67/40* (2013.01); *H04L 63/0209* (2013.01)

(58) Field of Classification Search
CPC ....... H04L 63/08; H04L 65/403; H04L 67/02; H04L 67/10; H04L 67/38; H04L 67/40; H04L 63/0209
See application file for complete search history.

(56) References Cited

U.S. PATENT DOCUMENTS

| | | | |
|---|---|---|---|
| 6,687,241 B1 * | 2/2004 | Goss | H04L 29/06 370/352 |
| 7,343,310 B1 * | 3/2008 | Stender | G06Q 10/10 705/4 |
| 8,095,972 B1 * | 1/2012 | Floyd | G06F 16/9574 726/9 |
| 8,319,816 B1 * | 11/2012 | Swanson | H04N 7/152 348/14.01 |
| 8,605,132 B1 * | 12/2013 | Swanson | H04N 7/155 348/14.01 |

(Continued)

*Primary Examiner* — Shean Tokuta
(74) *Attorney, Agent, or Firm* — Greenblum & Bernstein, P.L.C.

(57) ABSTRACT

An embodiment of the present invention is directed to a soft phone solution for voice and video calling. This allows for migration away from physical hard phones. The soft phone solution may be designed to be simple to use, and further infrastructure and vendor agnostic. An embodiment of the present invention may run cross-platform between corporate and Bring Your Own Devices (BYOD) for a consistent user experience. An embodiment of the present invention may then ultimately replace other existing clients to provide an any-device, any-time and anywhere solution.

20 Claims, 11 Drawing Sheets

(56) References Cited

U.S. PATENT DOCUMENTS

| | | | | |
|---|---|---|---|---|
| 8,695,058 | B2* | 4/2014 | Batchu | G06F 16/24573 |
| | | | | 726/1 |
| 8,897,177 | B2* | 11/2014 | Arora | H04L 12/1822 |
| | | | | 370/261 |
| 9,380,264 | B1* | 6/2016 | Vakalapudi | H04N 7/147 |
| 9,426,182 | B1* | 8/2016 | Zeljko | G06F 21/44 |
| 9,467,542 | B1* | 10/2016 | Messenger | H04M 15/32 |
| 9,686,323 | B1* | 6/2017 | Helter | H04L 65/1066 |
| 10,440,327 | B1* | 10/2019 | Bytyqi | G06F 3/1454 |
| 10,572,859 | B1* | 2/2020 | Evans | H04M 3/42068 |
| 10,652,286 | B1* | 5/2020 | George | H04L 67/306 |
| 10,742,649 | B1* | 8/2020 | Hook, Jr. | H04L 63/0876 |
| 2004/0193512 | A1* | 9/2004 | Gobin | H04L 63/166 |
| | | | | 705/29 |
| 2007/0214058 | A1* | 9/2007 | Rouhi | G06Q 50/34 |
| | | | | 705/26.1 |
| 2010/0174816 | A1* | 7/2010 | Piccinini | H04L 12/2859 |
| | | | | 709/227 |
| 2013/0162753 | A1* | 6/2013 | Hendrickson | H04L 65/1069 |
| | | | | 348/14.08 |
| 2013/0254830 | A1* | 9/2013 | Moganti | H04L 41/00 |
| | | | | 726/1 |
| 2014/0139609 | A1* | 5/2014 | Lu | H04N 7/15 |
| | | | | 348/14.03 |
| 2014/0164342 | A1* | 6/2014 | Liapis | G06F 16/951 |
| | | | | 707/706 |
| 2014/0173692 | A1* | 6/2014 | Srinivasan | H04W 12/02 |
| | | | | 726/4 |
| 2014/0195626 | A1* | 7/2014 | Ruff | H04W 12/088 |
| | | | | 709/206 |
| 2014/0245015 | A1* | 8/2014 | Velamoor | G06F 21/10 |
| | | | | 713/171 |
| 2014/0304836 | A1* | 10/2014 | Velamoor | H04L 63/08 |
| | | | | 726/28 |
| 2014/0344420 | A1* | 11/2014 | Rjeili | H04L 67/10 |
| | | | | 709/220 |
| 2015/0230274 | A1* | 8/2015 | Sharma | H04W 76/12 |
| | | | | 370/329 |
| 2015/0381594 | A1* | 12/2015 | Venkatesan | G06F 16/955 |
| | | | | 726/6 |
| 2016/0094562 | A1* | 3/2016 | Li | H04L 63/105 |
| | | | | 726/28 |
| 2017/0046134 | A1* | 2/2017 | Straub | G06F 8/31 |
| 2017/0171200 | A1* | 6/2017 | Bao | H04L 63/0876 |
| 2018/0005500 | A1* | 1/2018 | Robertson | G06K 9/00369 |
| 2018/0054720 | A1* | 2/2018 | Messenger | H04M 3/53333 |
| 2018/0068108 | A1* | 3/2018 | Fish | H04L 63/0428 |
| 2018/0137470 | A1* | 5/2018 | Donnelly | H04W 4/024 |
| 2018/0247077 | A1* | 8/2018 | Barrett-Bowen | G06F 21/6245 |
| 2019/0068372 | A1* | 2/2019 | Bhatnagar | H04L 9/321 |
| 2019/0082143 | A1* | 3/2019 | Ren | H04N 7/152 |
| 2019/0139002 | A1* | 5/2019 | Kumar | H04L 65/403 |
| 2019/0244613 | A1* | 8/2019 | Jonas | H04M 7/006 |
| 2020/0008029 | A1* | 1/2020 | Cao | H04W 4/20 |
| 2021/0044634 | A1* | 2/2021 | Hughes | H04L 67/38 |

* cited by examiner

SYSTEM AND METHOD FOR IMPLEMENTING VIDEO SOFT PHONE APPLICATIONS

CROSS REFERENCE TO RELATED APPLICATIONS

The application claims priority to U.S. Provisional Application 62/883,892, filed Aug. 7, 2019, the contents of which are incorporated herein in their entirety.

FIELD OF THE INVENTION

The invention relates generally to a system and method for implementing a video soft phone application across various enterprise devices.

BACKGROUND OF THE INVENTION

Current communication systems can include a number of disparate solutions, clients and devices for voice and video calling. Desk phones are traditionally used in an office space but such phones are not portable, expensive and complex to refresh. On the road, there are various mobile clients with differing experiences, some are outbound only or have a different phone number. Some are call-back only which add friction to the experience.

Current vendor solutions only partially meet a company's needs and cannot be fully customized. As such, companies feel bound to incumbent vendor products with little control over the user experience or integration between services. Accordingly, end users are forced to juggle multiple clients and switch contexts to allow communication to flow.

Moreover, given the current climate, companies are transitioning to remote work or work from home set-ups for most or all employees. Companies face challenges having to deal and integrate with various personal home devices.

These and other drawbacks exist.

SUMMARY OF THE INVENTION

According to one embodiment, the invention relates to a system that implements a soft phone integration. The system comprises: a centralized framework that delivers API driven communication capabilities and micro-services; a set of communications clients to deliver a plurality of communication and collaboration tools across a plurality of disparate devices associated with a plurality of different employees of an entity; and a computer processor, coupled to the centralized framework and the set of communication clients, configured to perform the steps of: receiving a request for communication at an input interface from an employee associated with a first device; connecting, via a communications platform, the request for communication to a recipient, wherein the recipient and the employee are employed by the entity; and directing, via a call manager, the request for communication to a second device from a plurality of devices associated with the recipient wherein the first device is different in type and model from the second device and at least one of the first device and the second device is a personal device that is not issued from the entity; wherein the centralized framework is infrastructure and vendor agnostic and the plurality of communication and collaboration tools are executed in a uniform and consistent manner across the first device and the second device.

According to another embodiment, the invention relates to a method that implements a soft phone integration. The method comprises the steps: receiving, at a centralized framework, a request for communication at an input interface from an employee associated with a first device, wherein a centralized framework that delivers API driven communication capabilities and micro-services and provides a set of communications clients to deliver a plurality of communication and collaboration tools across a plurality of disparate devices associated with a plurality of different employees of an entity; connecting, via a communications platform, the request for communication to a recipient, wherein the recipient and the employee are employed by the entity; and directing, via a call manager, the request for communication to a second device from a plurality of devices associated with the recipient wherein the first device is different in type and model from the second device and at least one of the first device and the second device is a personal device that is not issued from the entity; wherein the centralized framework is infrastructure and vendor agnostic and the plurality of communication and collaboration tools are executed in a uniform and consistent manner across the first device and the second device.

The system may include a specially programmed computer system comprising one or more computer processors, interactive interfaces, electronic storage devices, and networks. The computer implemented system and method described herein provide unique advantages to entities, organizations, employees and other users, according to various embodiments of the invention. An embodiment of the present invention may achieve benefits, including cost reduction, improved mobility, BYOD (Bring Your Own Device) access and Line of Business (LOB) integration. Cost reduction may include eliminating hundreds of thousands of desk phones on a refresh cycle (e.g., 5 years or so) plus ongoing maintenance. Improved mobility allows users to use a hot desk and move between buildings, countries and regions and still have access to calls. BYOD access enables users to access office phone numbers on any device, voice and video from anywhere. This further enhances work from home and remote work experiences. LOB integration provides integration of calling into existing LOB applications and workflows and further lets them remain in context. An embodiment of the present invention provides flexibility, customization and seamless integration not available with current communication systems.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
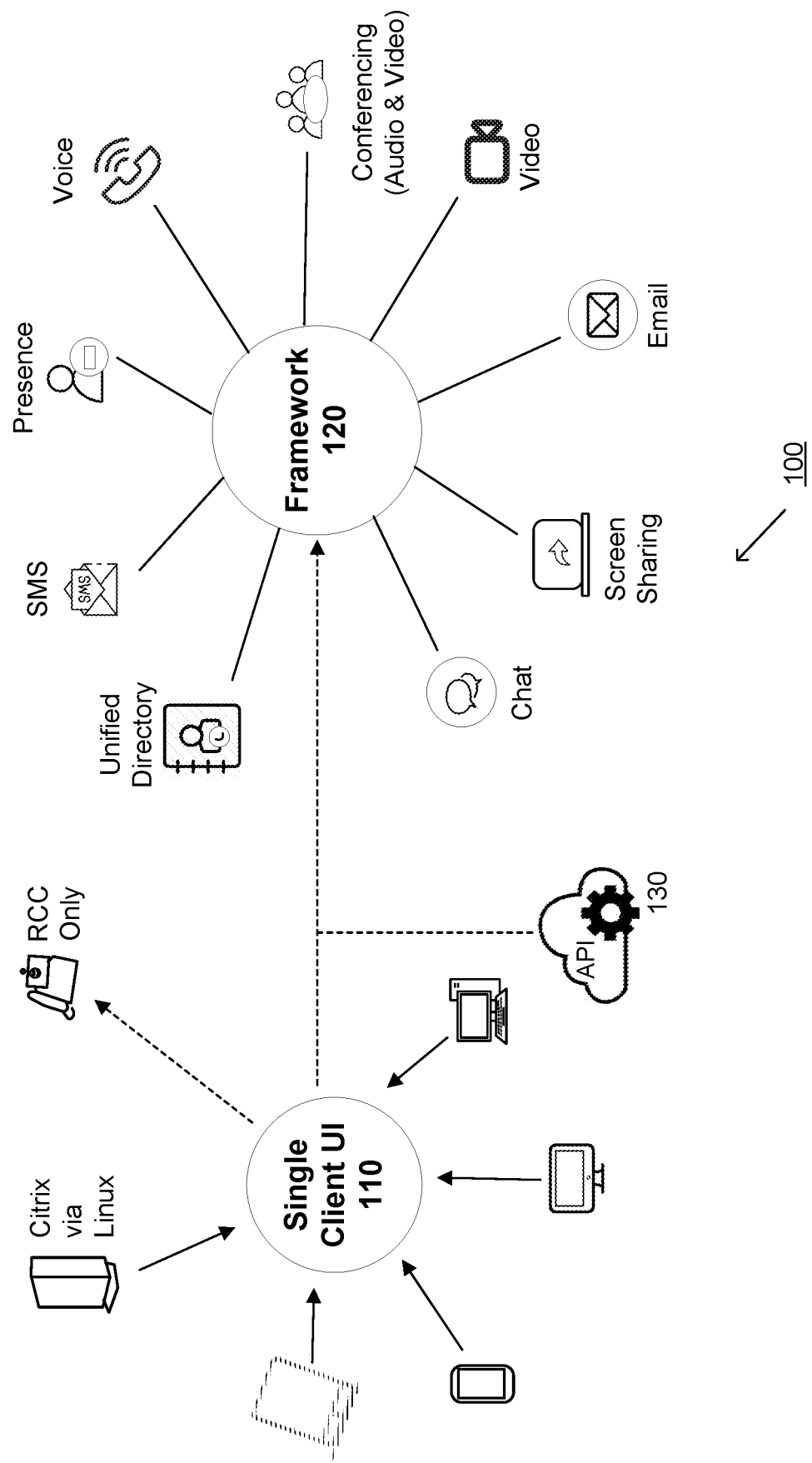
FIG. 1 illustrates an exemplary system that supports soft phone integration, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a soft video phone client for voice and video calling and other forms of communication. A client may represent computer hardware and/or software that accesses a service made available by a server or other system. The client may enable an entity or provider to replace physical desk phones with various different clients and other applications. This allows the same phone number to be accessed and used from anywhere, on any device at any time. An entity may represent an employer, company and/or other provider with employees, customers, users, partners, etc.

An embodiment of the present invention provides an entity with a fully branded user interface and further provides the entity with control of the user interface. An embodiment of the present invention provides a consistent experience between devices and clients. An abstraction layer between the user and the backend enables an entity to be vendor and platform agnostic and further replaces items, features and functions as needed while keeping the user experience constant and uniform. For example, an embodiment of the present invention may extend APIs to LOB Developers to provide a standard way of embedding calling features into business/client applications. An embodiment of the present invention provides flexibility and a level of customization that is not available with current communication systems.

According to an embodiment of the present invention, a middleware/backend may be based on a commercial platform. For example, an exemplary implementation may leverage a cloud communications platform (e.g., Ribbon Kandy platform) for a custom in-house soft video phone client for voice and video calling. Other communications platforms may be integrated.

An embodiment of the present invention may incorporate conferencing, moderator control, screen sharing, chat, short message service (SMS) messaging and other communications services, features and functions. For example, exemplary features may include: manually enter a phone number and initiate a call; perform a people search and initiate a call; perform answer or reject an inbound call; view status of active calls and disconnect when finished. Additional features may include: view a missed call notification and return the call; place a call on hold, then resume it; change preferred audio devices (e.g., headset/speaker); place a call on hold, then transfer it to someone else; change the call volume; ensure that a user does not have duplicate call notifications; and add someone else to the call to escalate to multi-party.

An embodiment of the present invention enables employees to work seamlessly at home from a personal computer or other personal device. An embodiment of the present invention further ensures voice recording compliance when employees connect through personal and other devices. Other standards and regulations compliances may be achieved.

FIG. 1 illustrates an exemplary system that supports soft phone integration, according to an embodiment of the present invention. As shown in FIG. 1, a Single Client UI 100 may enable an end user to communication via various modes of communication. The end user may use personal devices and various non-employer issued devices as well. The Single Client UI may communicate with a Framework 120 with access to an array of features and functionality, including Unified Directory, short message service (SMS), Presence, Voice, Conferencing, Video, email, screen sharing, chat, etc. As shown in FIG. 1, an embodiment of the present invention provides direct integration with an entity and third party LOB applications 130.

An embodiment of the present invention may be directed to building and adopting a centralized framework to deliver API driven communications capabilities and micro-services to technology and line of business (LOB) partners. An embodiment of the present invention may be directed to building a set of communication clients to deliver multiple forms of communication and collaboration capabilities across corporate and BYOD devices. An embodiment of the present invention provides a fully branded communication devices and allows underpinning products and services to be abstracted and if needed, replaced and/or updated on demand.

In addition, features may include media on virtual desktop, universal screen share, consistent user experience and external access. Media on virtual desktop ensures a reliable, scalable and efficient real-time voice and video media experience for virtual desktop users (e.g., Citrix VDI via Linux thin client, etc.). Universal screen share enables consolidating to a single standards-based screen sharing service, compatible across various end-points, and having it extensible for embedding into LOB applications. Consistent user experience builds a cross platform and cross device client that provides a familiar and consistent user interface and feature set. With external access, entities may extend connectivity to external participants in a secure, scalable and reliable manner (e.g., Web, MAC/PC Client and Mobile/Tablet, etc.).

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Figure 2:
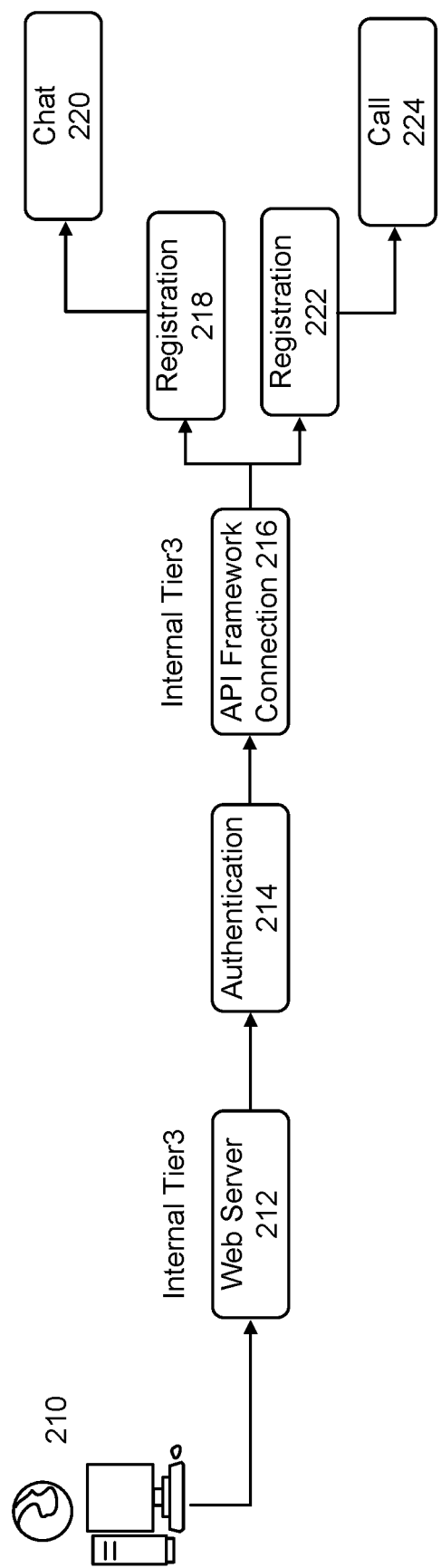
FIG. 2 illustrates a flowchart for an exemplary use case, according to an embodiment of the present invention.

FIG. 2 illustrates a flowchart for an exemplary use case, according to an embodiment of the present invention. For example, a user may be located in an office in London on a physical Win7 desktop. The first user may make a call to another user in a Jersey City office on his desk phone, or send a chat to him via a messaging service, e.g., Skype-For-Business (SFB). As shown in FIG. 2, the user may access Web Server 212, which represents Internal Tier 3. Authentication 214 may be performed through a local user accounts services (e.g., communications manager) or directory service that manages computers and other network devices. API Framework Connection 216 may represent Internal Tier 3 and may further initiate registration for various communication services. The example of FIG. 2 illustrates registration to unified communications platform 218 and another platform 222 (e.g., Skype for Business, Cisco Unified Communications Manager, etc.). Functions may include Chat 220 and Call 224. Other forms of communication may be supported.

Figure 3:
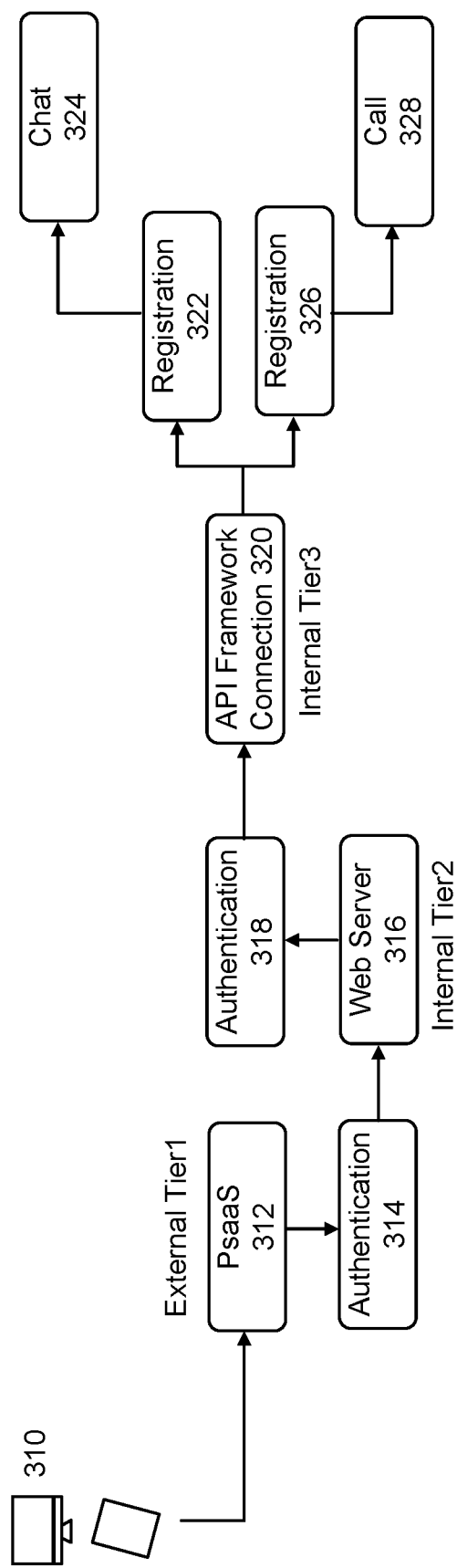
FIG. 3 illustrates a flowchart for an exemplary use case, according to an embodiment of the present invention.

FIG. 3 illustrates a flowchart for an exemplary use case, according to an embodiment of the present invention. For example, a user may work from home on her BYOD MAC/PC or Mobile/Tablet. The user may make a call to another user in the Bangalore office on his desk phone, or send a chat to him via a messaging service, e.g., Skype-For-Business.

As shown in FIG. 3, the user may access Physical Security as a Service (PsaaS) 312, which represents External Tier 1. Authentication 314 may be performed through a single-sign-on (SSO), Active Directory Federation Services (ADFS), etc. Web Server 316, which represents Internal Tier 2, may be accessed. Authentication 318 may be performed through a local user accounts services (e.g., communications manager) or directory service that manages computers and other network devices. API Framework Connection 320 may represent Internal Tier 3 and may further initiate registration for various communication services. The example of FIG. 3 illustrates registration to unified communications platform 322 and another platform 326 (e.g., Skype for Business, Cisco Unified Communications Manager, etc.). Functions may include Chat 324 and Call 328. Other forms of communication may be supported.

Figure 4:
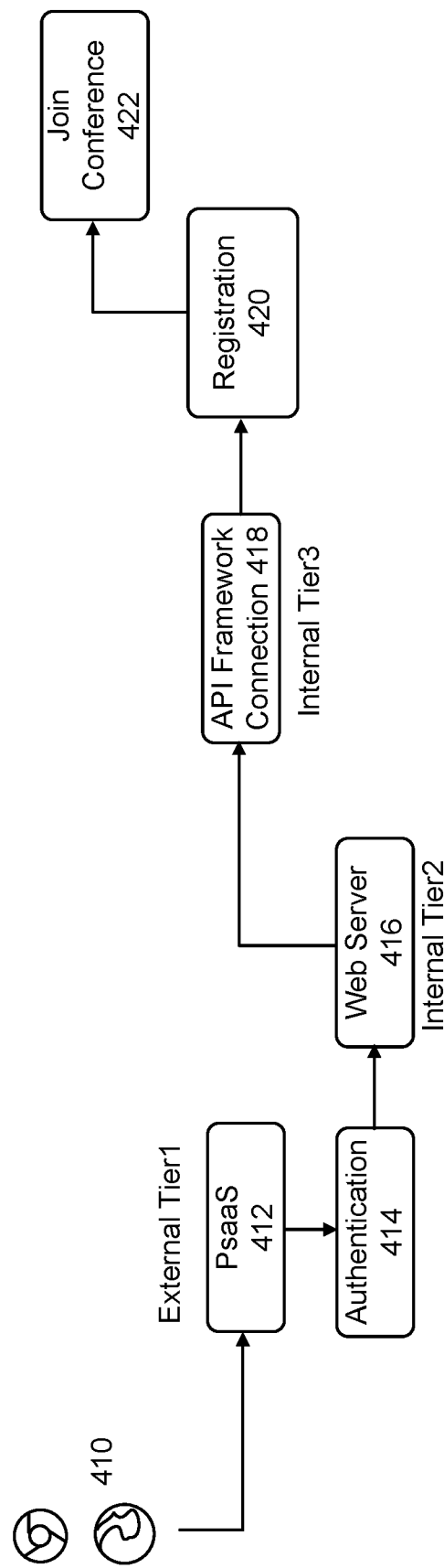
FIG. 4 illustrates a flowchart for an exemplary use case, according to an embodiment of the present invention.

FIG. 4 illustrates a flowchart for an exemplary use case, according to an embodiment of the present invention. In this example, a user may represent a graduate candidate interviewing with another user and yet another user regarding a position via video conference. One user may join the meeting via his web browser, and the other users may wish to join the same meeting using their personal TelePresence or desk phones.

As shown in FIG. 4, the user may access Physical Security as a Service (PsaaS) 412, which represents External Tier 1. Authentication 414 may be performed via identifier/name, conference code and password, for example. Web Server 416, which represents Internal Tier 2, may be accessed. API Framework Connection 418 may represent Internal Tier 3 and may further initiate registration for various communication services. The example of FIG. 3 illustrates registration to unified communications platforms 418 that joins video, audio, web and chat communications together (e.g., ACANO, etc.). Functions may include join conference 422. Other forms of communication may be supported.

Figure 5:
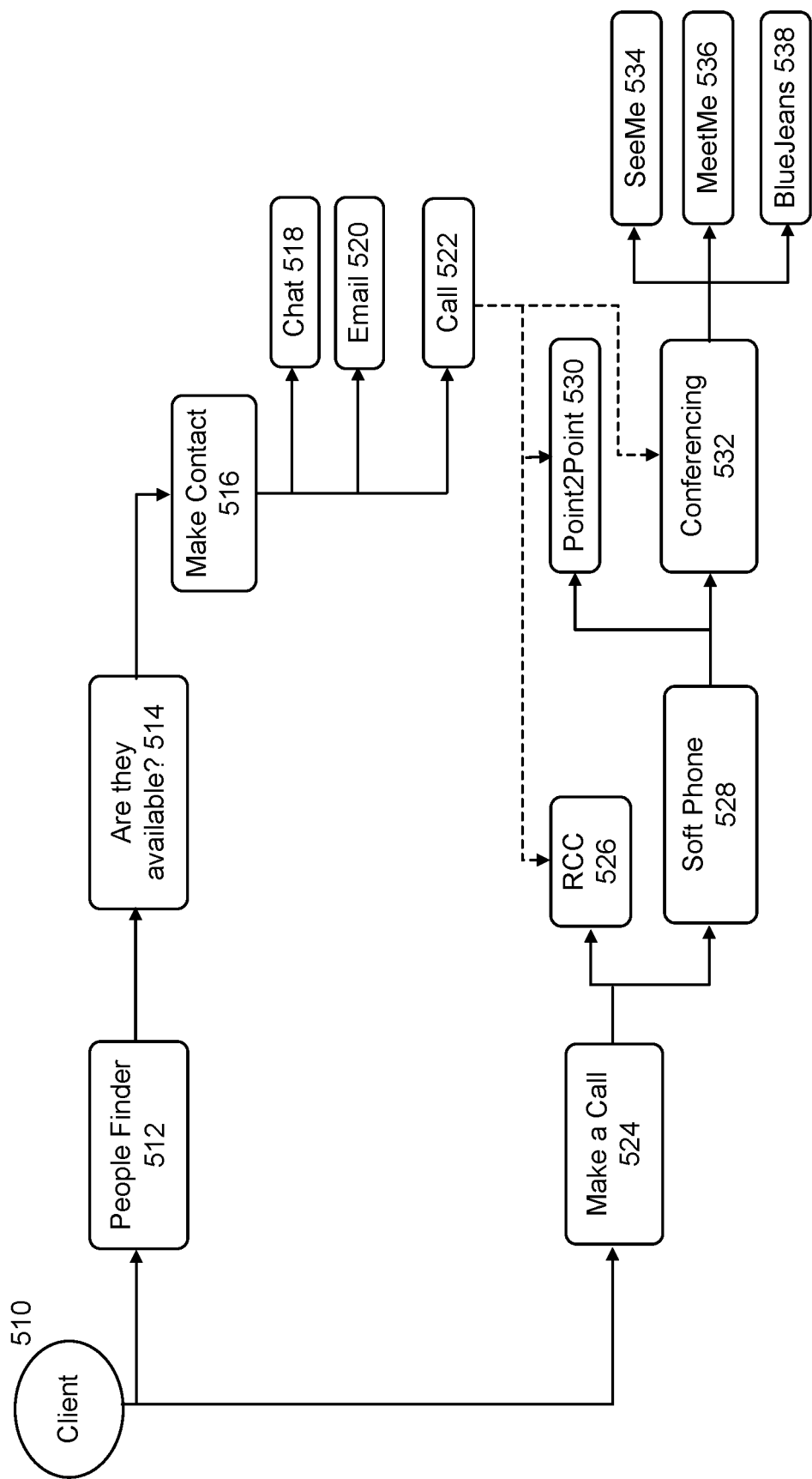
FIG. 5 illustrates additional use cases and interactions, according to an embodiment of the present invention.

FIG. 5 illustrates additional use cases and interactions, according to an embodiment of the present invention. In this example, an end user through a client device 510 may locate a person via a People Finder application as shown by 512. This may include a firm-wide directory or other type of directory. The system may determine whether the located person is available at 514 and initiate a contact at 516. The contact may include Chat 518, Email 520 and Call 522. According to another example, the end user may make a direct call as shown by 524. The call may go through RCC 526 or a soft phone application 528. RCC represents radio common carrier. Soft phone application 528 may provide communication via Point2Point 530 as well as Conferencing 532, which may be supported by various video conferencing platforms and applications, SeeMe 534, MeetMe 536, BlueJeans 538 and others. Point2Point communications may refer to a communications connection between two communication endpoints or nodes, such as a telephone call.

Figure 6:
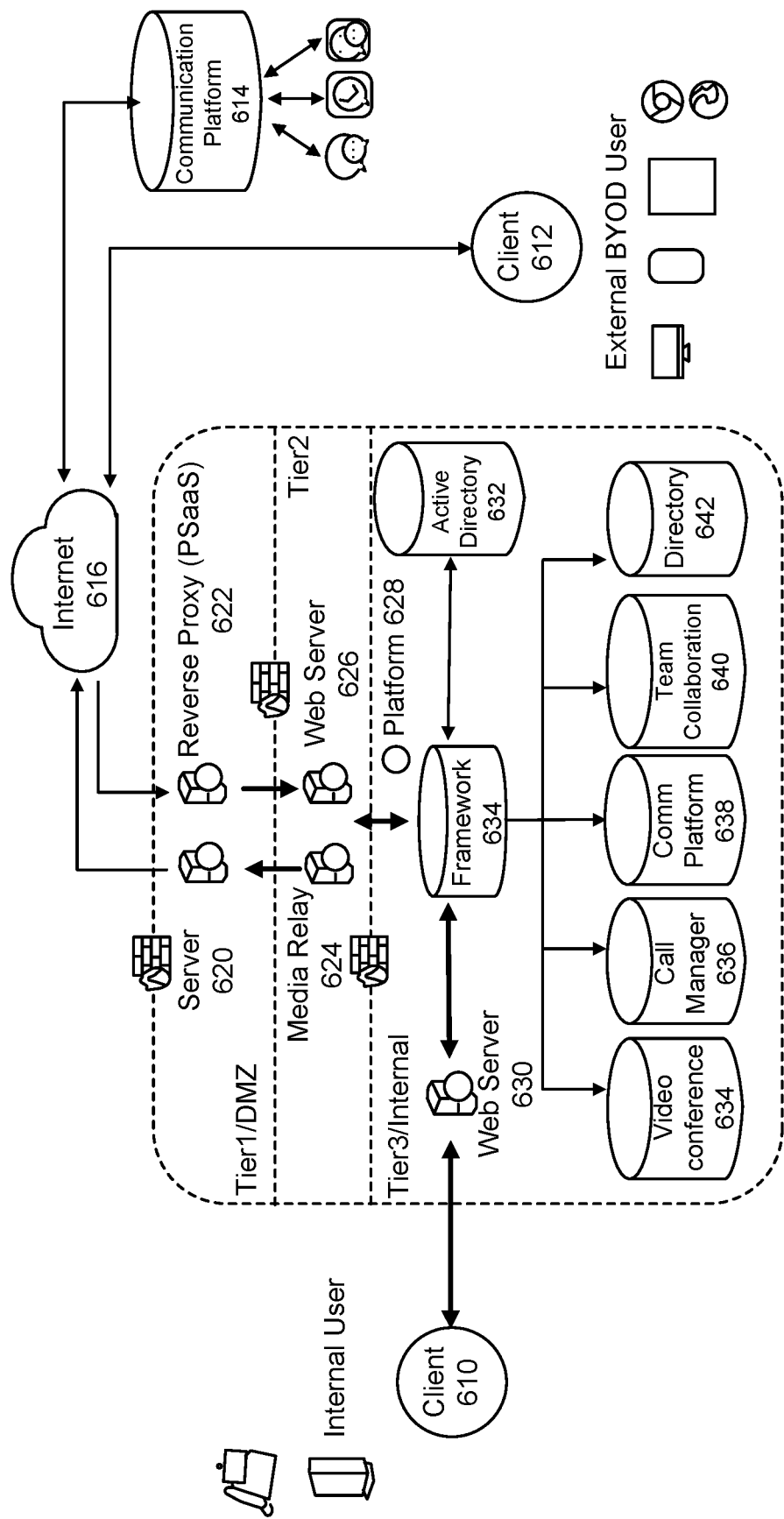
FIG. 6 illustrates an exemplary high-level architecture, according to an embodiment of the present invention.

FIG. 6 illustrates an exemplary high-level architecture, according to an embodiment of the present invention. As shown in FIG. 6, an internal client may communicate with other clients through various BYOD, internal and external devices. The communication system may include a framework that access various services and communication systems. Internal clients may be represented by Client 610. Client 610 may access Web Server 630 which then communicates with Framework 634. Tier3/Internal may include Web Server 630, Framework 634 and Active Directory 632. Framework 634 may interact with various applications represented by Video Conference 634, Call Manager 636, unified communications platform 638, Team Collaboration 640 and Directory 642.

External users may be represented by 612. Client 612 may utilize various external devices and applications through Internet 616. Communication Platform 614 users may also access Internet 616. Communication Platform 614 may represent a platform or service that combines chat, voice and video conferencing, such as Symphony.

Tier 1/DMZ may include Server 620 and Reverse Proxy (PSaaS) 622. Tier 1/DMZ represents a subnetwork that contains and exposes external-facing services to Internet 616.

Tier 2 may include Media Relay 624 and Web Server 626. Media Relay 624 may receive media streams from a network. Tier 2 interacts with Framework 634 through a cloud communications platform 628.

Figure 7:
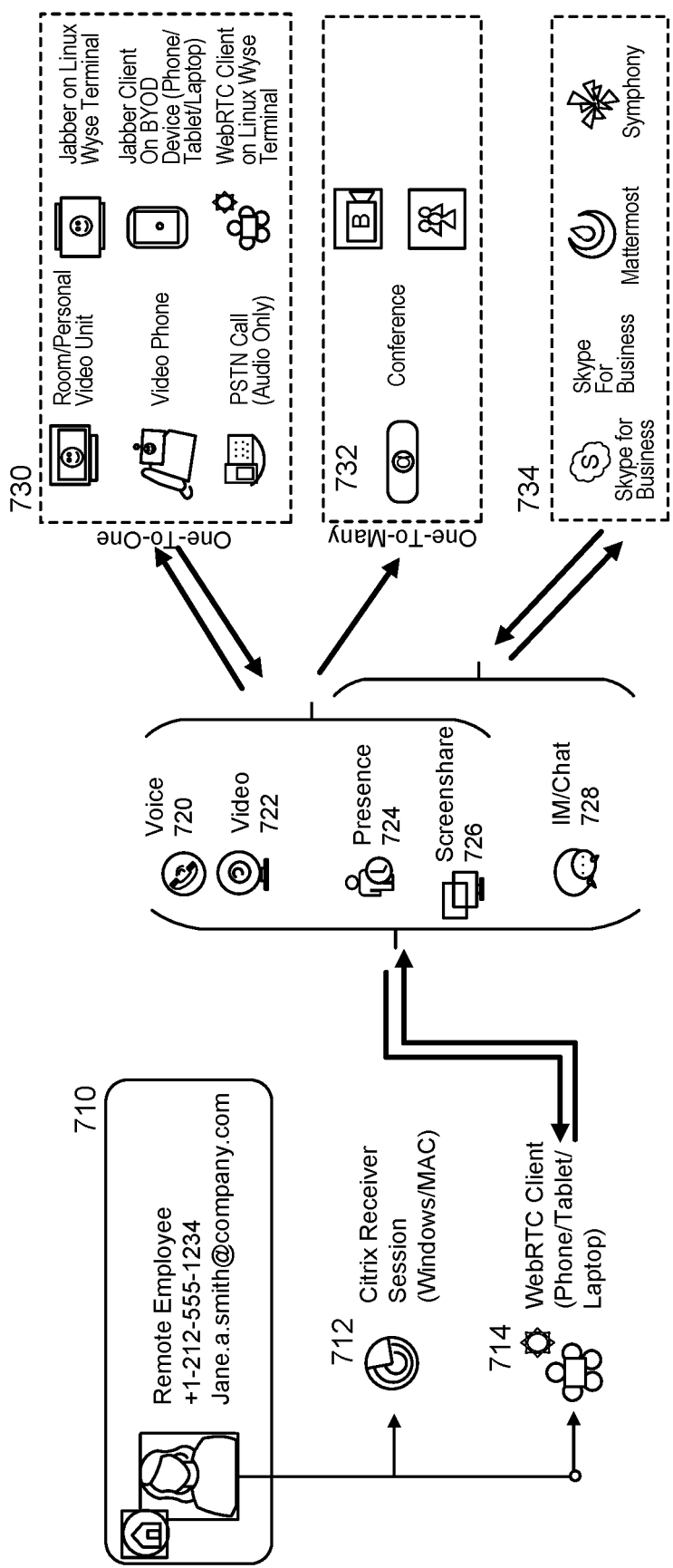
FIG. 7 illustrates an exemplary use cases, according to an embodiment of the present invention.

FIG. 7 illustrates an exemplary use cases, according to an embodiment of the present invention. As shown in FIG. 7, user may work remotely via a BYOD device. In this example, the user may communicate with other employees and external contacts, both inbound and outbound.

As shown in FIG. 7, a remote employee 710 may initiate a communication session, such as through Citrix Receiver Session 712 and WebRTC Client 714. In this exemplary implementation, communication may be achieved through Voice 720, Video 722, Presence 724, Screenshare 726 and Chat 728. Other modes of communication may be supported. The system of FIG. 7 supports One-to-One communication 730, One-to-Many communication 732 and other enterprise applications 734.

Figure 8:
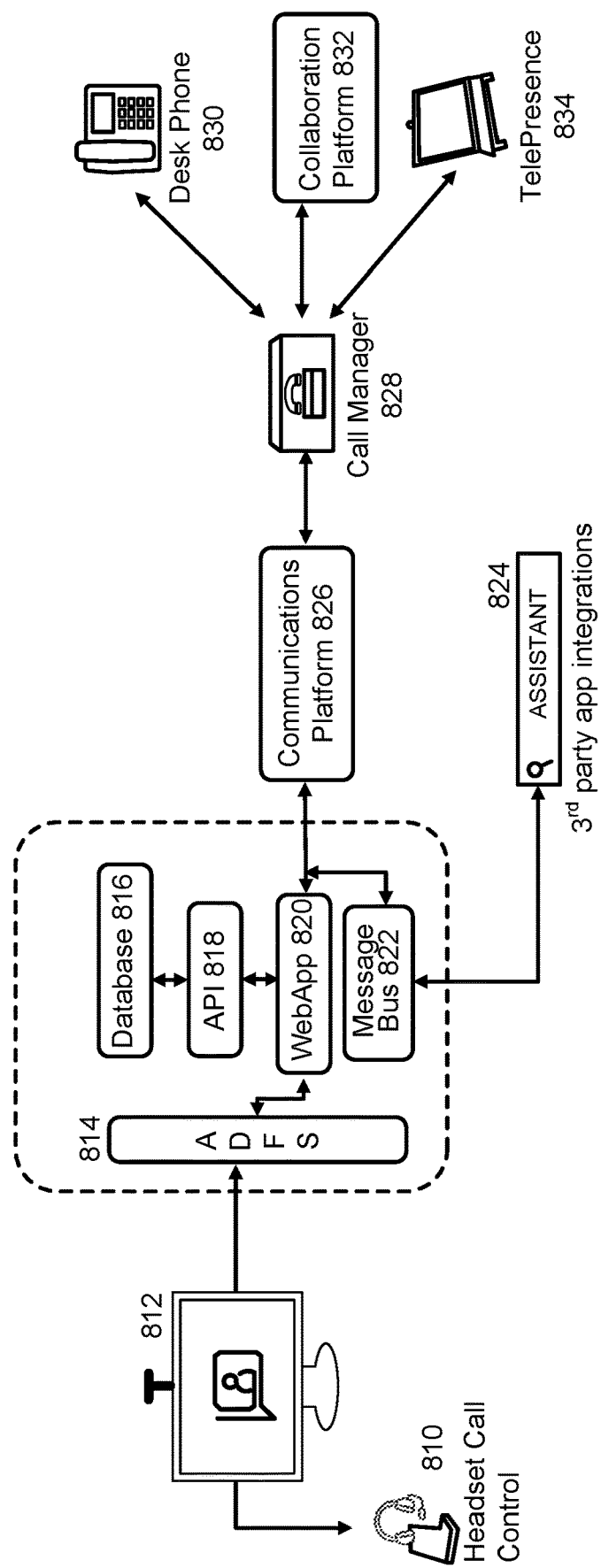
FIG. 8 illustrates an exemplary high-level architecture, according to an embodiment of the present invention.

FIG. 8 illustrates an exemplary high-level architecture, according to an embodiment of the present invention. As shown in FIG. 8, a user may initiate communication via Headset Call Control 810 through a desktop device 812 (or other device). An embodiment of the present invention may incorporate a sign-on interface, which may include Active Directory Federation Services (ADFS) 814, Database 816, API 818, WebApp 820 and Message Bus 822. Third party application integration may be supported by Assistant 824. WebApp 820 may interact with Communications Platform 826. Call Manager 828 may further interact with various end devices, such as desk phone 830, collaboration platform 832 and telepresence devices 834.

According to an embodiment of the present invention, Assistant 824 may represent a personal virtual assistant application. Assistant 824 may execute as a pop-up and provide notifications to employees and users. For example, Assistant 824 may notify an employee that a video meeting is starting in 5 minutes and further provide the link to start the video meeting. By clicking on the link, a video conferencing application may automatically execute and further populate with meeting codes (including other authentication information).

Other features may include: Beacon Technology; Webtop and Inband Conference Control. With Beacon technology, an embodiment of the present invention may identify a WiFi Access Point a user is connected to, so their current location may be updated automatically. An embodiment of the present invention may provide an end-to-end communications portal via a browser construct so a user may not be required to login to a desktop session. Inband Conference Control may bring conferencing controls inside the video frame, for in-call and in-window call control.

Figure 9:
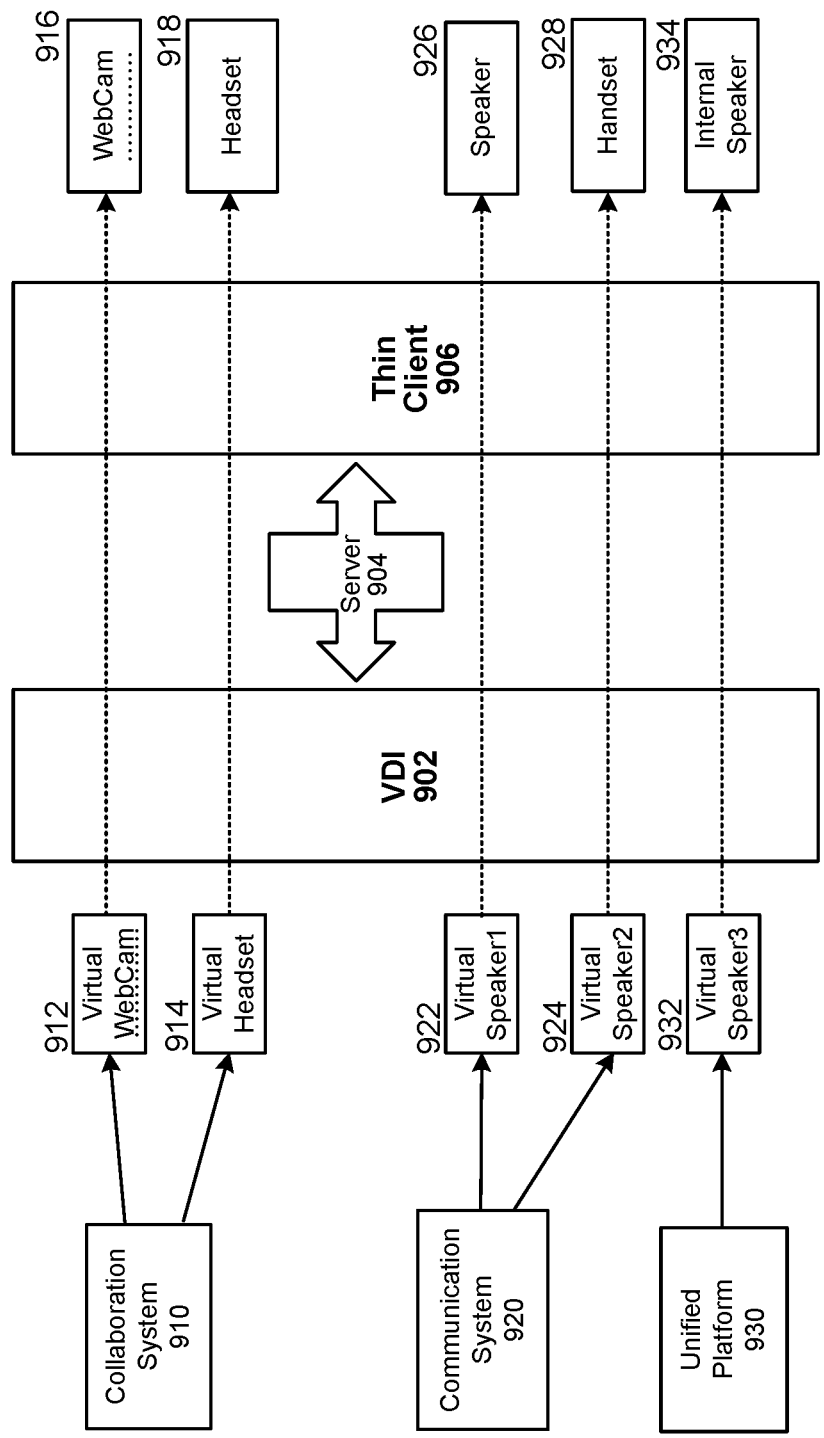
FIG. 9 illustrates a virtual device and physical device mapping, according to an embodiment of the present invention.

FIG. 9 illustrates a virtual device and physical device mapping, according to an embodiment of the present invention. Various communication applications and platforms may be supported by the system of FIG. 9. As shown in FIG. 9, virtual devices may be mapped to corresponding physical devices. Collaboration System 910 may represent a communication and collaboration application. Communication System 920 may represent a communications platform, which may be specific for traders and financial markets. Unified Platform 930 may represent a unified communications platform. Each system may interact with various virtual devices. For example, Collaboration System 910 may interact with Virtual WebCam 912 and Virtual Headset 914. Communication System 920 may interact with Virtual Speaker 1 922 and Virtual Speaker 2 924. Unified Platform 930 may interact with Virtual Speaker 3 932. Virtual devices may correspond to hardware devices through VDI 902, Server 904 and Thin Client 906. Hardware devices may include a variety of different types of devices, makers and models, including WebCam 916, Headset 918, Speaker 926, Handset 928 and Internal Speaker 934.

VDI 902 represents virtual desktop infrastructure that creates a virtualized desktop environment on a remote server. Server 904 may provide virtualization infrastructure that enables remote access, such as Citrix, for example. Thin Client 906 may represent a lightweight computer optimized for establishing a remote connection. With an embodiment of the present invention, a communications application may execute inside the Server 904 (as opposed to outside the server which would require starting a new tab and a different window).

An embodiment of the present invention may provide remote device management capabilities. Remote devices may include peripherals such as headphones, headsets, speakers, cameras, input devices, wireless devices etc.

For example, a trader may have a complex desktop setup with multiple screens, devices, applications, peripherals, etc. An embodiment of the present invention may enable traders to switch to a virtual desktop with a corresponding physical setup. In this example, traders may select and execute different output devices along with peripherals. For example, a trader may select a specific brand and model of hardware and other devices, e.g., microphone, headset, screen, etc.

Figure 10A:
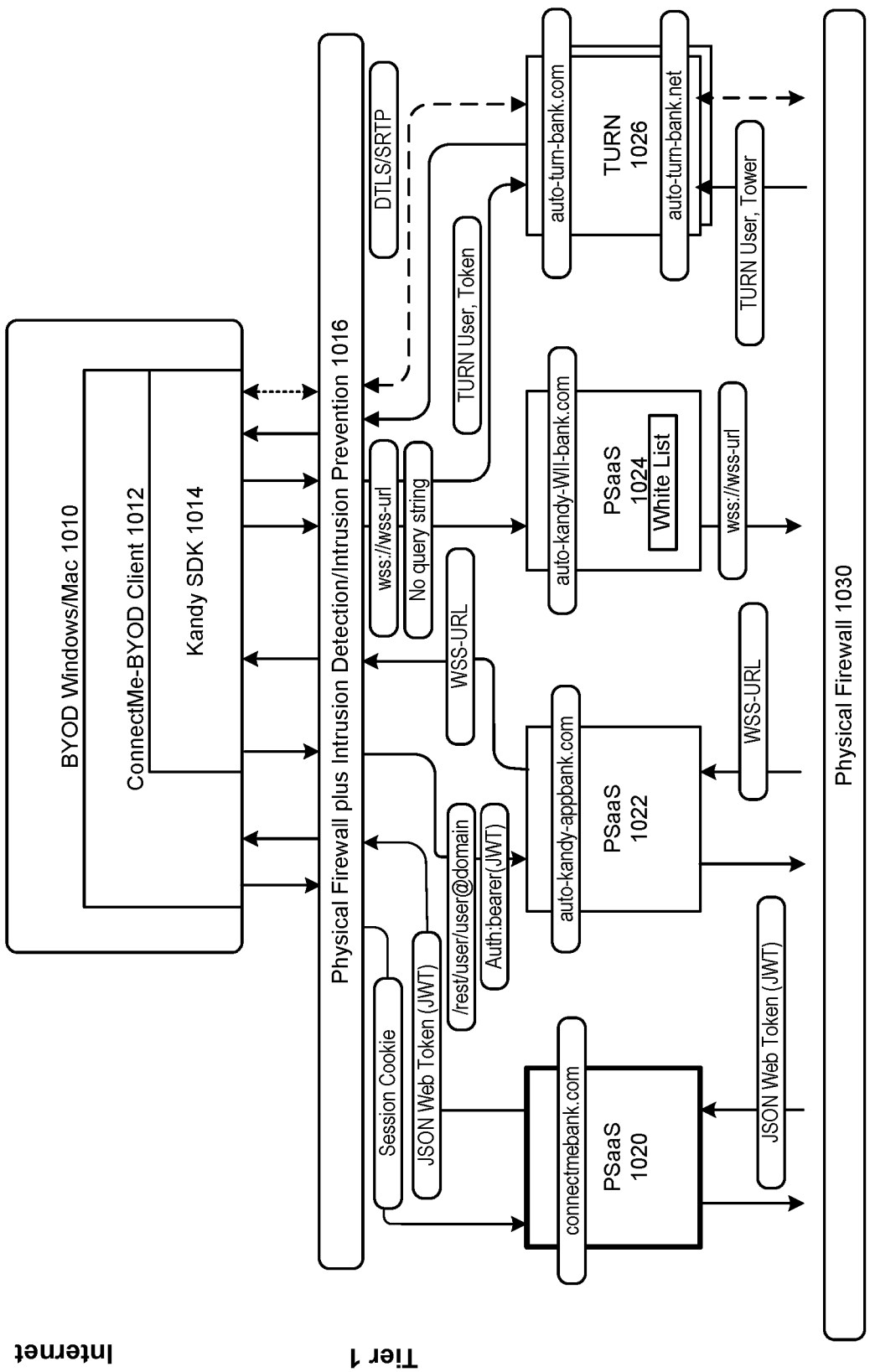
FIGS. 10A and 10B illustrate exemplary traffic flows, according to an embodiment of the present invention.
Figure 10B:
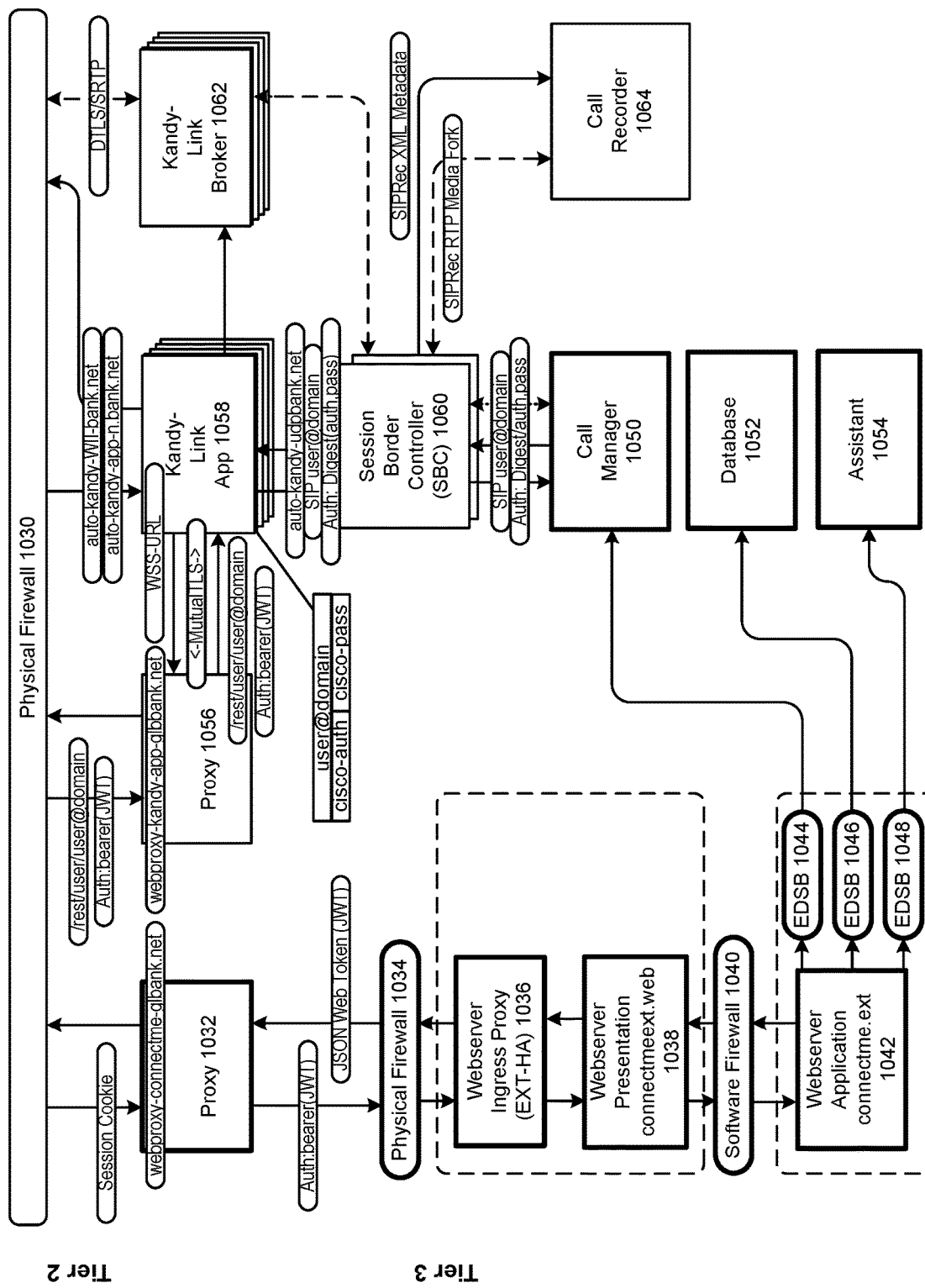

FIGS. 10A and 10B illustrate exemplary traffic flows, according to an embodiment of the present invention. An embodiment of the present invention may be designed to run on users' various personal BYOD devices. This provides a user experience close to that which they have when sitting at their desk. An embodiment of the present invention may support various data flows.

An embodiment of the present invention may include various high-level building blocks including Client, Webserver, Proxies, Server, Link, Session Border Controller and Call Manager. Other implementations with varying services and products may be used in accordance with the various embodiments of the present invention. FIGS. 10A-B illustrate one exemplary embodiment for illustration purposes. Accordingly, the embodiments of the present invention are not limited to the illustration of FIGS. 10A and B.

Client devices and applications may include device 1010 (e.g., BYOD Windows/Mac) and client 1012 (e.g., BYOD Client) which may communicate with Physical Firewall 1016 through SDK 1014 (e.g., Kandy SDK). Physical Firewall 1016 may support intrusion detection and intrusion prevention.

The Client (BYOD) 1012 may run a JavaScript web page, initially running on a browser on a user's BYOD device. In addition, the client may include an App version. The Client may use a gateway SDK (e.g., Kandy SDK) to communicate with a gateway (e.g., Kandy-Link) and manage WebRTC sessions with the browser.

Webserver may host the client (BYOD) code and run the API code that detects and stores information about the end-user.

Proxies (e.g., externally facing web proxy represented by Proxy 1032, Proxy 1056) may represent a mechanism for controlling access to externally-facing web proxy.

The server may include a TURN Server 1026, which is a Traversal Using Relay NAT—a protocol for relaying network traffic. An embodiment of the present invention may provide an application-controlled routing function in the DMZ for media. The server provides a transit path for media (e.g., voice, video, etc.) that supports Transport Layer Security (TLS). The server may further provide Network Address Translation (NAT) address resolution services.

Gateway may represent a WebRTC to SIP gateway. Gateway may represent an intelligent bridge between voice over internet protocol (VoIP) networks and the Internet. In addition, Gateway may enable enterprises to leverage APIs and SDKs to provide differentiated user experiences and integrate communications (e.g., voice, video, messaging, chat and collaboration). An exemplary gateway may include Kandy-Link (e.g., 1058, 1062) that represents a WebRTC to SIP gateway. Other gateways, links and/or bridges may be supported.

Session Border Controller (SBC) 1060 represents a voice security device that provides firewalling and session control functionality. Session Border Controllers may protect and regulate IP communication flows. As shown in FIG. 10A, Session Border Controller may provide a secure and approved path for VoIP traffic between Tiers 2 and 3. Call Manager 1050 may control the desk phones within an organization.

An embodiment of the present invention may support various data flows.

A first data flow may include Client to Webserver. Here, client 1012 may contact Webserver via an externally advertised PSaaS Fully Qualified Domain Names (FQDN) 1020. This data flow may use HTTPS on port 443. The Client may represent a web page that is loaded from Web server.

According to an exemplary data flow involving Client to Webserver, the Client to Webserver flows may using an externally facing web proxy. The Client may be authenticated using an identity and authentication provider at Proxy 1032, which establishes an OAuth JSON Web Token (JWT) for the user. The resulting JSON Web Token (JWT) may be passed to the CONNECTMEEXT App via Physical Firewall 1034 to Webserver Ingress Proxy 1036, Webserver Presentation 1038. An embodiment of the present invention may be referred to as a "ConnectMe" application or service. Webserver application 1042 may be accessed via Software Firewall 1040. Through external dependency service broker (EDSB) 1044, 1046 and 1048, interactions with Call Manager 1050, Database 1052 and Assistant 1054 may be achieved. CONNECTMEEXT then returns the JWT to the Client to be used in the next flow. The Javascript that makes up the ConnectMe Client may be hosted in Webserver and downloaded to a browser on the Client. Other implementations with varying services and products may be used in accordance with the various embodiments of the present invention. FIG. 10A-B illustrate one exemplary embodiment for illustration purposes. Accordingly, the embodiments of the present invention are not limited to the illustration of FIGS. 10A and B.

Another data flow may include Client to Gateway (HTTPS). Here, client may connect to its chosen gateway infrastructure via an externally advertised PSaaS FQDN 1022. This data flow may use HTTPS on port 443.

According to an exemplary data flow involving Client to Kandy (REST), the main signalling path between the Client and Kandy may use REST over HTTPS on port 443. As the Proxy cannot selectively route to multiple internal hosts, this traffic cannot use the same Proxy instance used by the Webserver traffic. The JWT that was returned to the Client by Webserver may be used to authorize the REST traffic at a second externally facing web proxy. This second Proxy 1056 connects to Kandy-Link 1058 using HTTPS and mutual TLS 1.2 authentication is performed to establish trust. Because of the mutual TLS 1.2 connection to the Proxy 1056, Kandy-Link 1058 may treat the Proxy 1056 as a Trusted Endpoint. Kandy-Link 1058 may use the username supplied by the Client in the URL to locate an authname and password in its database. Using these credentials, Kandy-Link 1058 registers with Call Manager 1050, via the Session Border Controller (SBC) 1060. Kandy-Link 1058 generates a unique Secure WebSockets (WSS) URL and returns it to the Client via the authenticated HTTPS Proxy 1056. Other implementations with varying services and products may be used in accordance with the various embodiments of the present invention. FIG. 10A-B illustrate one exemplary embodiment for illustration purposes. Accordingly, the embodiments of the present invention are not limited to the illustration of FIGS. 10A and B.

Another data flow may include Client to Gateway (WebSockets). Here, Client may connect to its chosen gateway infrastructure via an externally advertised PSaaS FQDN 1024. This data flow may use Secure WebSockets on port 443.

According to an exemplary data flow involving Client to Kandy (Secure WebSockets), Kandy-Link generates a unique ID and token that it uses to create a unique WSS URL. This is passed to the Client over the authenticated REST path described above in connection with the data flow involving Client to Kandy (REST) described above. The Client initiates a Secure WebSocket (WSS) to Kandy-Link 1058 using the WSS URL (that includes the token). This WSS is initiated via PSaaS 1024 and the white-list.

Another data flow may include Client to (TURN) Server. Here, Client has access to two servers (e.g., TURN servers) via externally advertised PSaaS FQDNs. Client may attempt to make connections to both TURN servers using HTTPS on port 443. Once the call is in progress, Media (video and audio) may be sent from the Client to the selected TURN server 1026 using DTLS/SRTP inside a TLS 1.2 session on TCP port 443.

Another data flow may include Gateway (e.g., Kandy) to (TURN) server. In this exemplary illustration, Kandy-Link 1058 is in Tier 2 and the TURN server 1026 is in Tier 1—connected to both the internal-facing and external-facing VLANs. Control traffic between the two flows within a TLS 1.2 tunnel, which may be initiated by the Kandy-Link servers 1058 in Tier 2, using TCP port 3500. Media may be sent between the TURN server and the Kandy-Link Brokers 1062 using DTLS-SRTP over UDP port 16384-32766.

According to an exemplary data flow involving Client to Kandy to Turn Server, Kandy-Link 1058 initiates a TLS 1.2 tunnel from Tier 2 to Tier 1 through the firewall 1030 to the TURN server 1026. Through this, it notifies the TURN server 1026 of the Client's ID and Token. The TURN server 1026 stores these in its SHA-256 encrypted database. Kandy-Link 1058 also sends this ID and Token to the Client over the authenticated HTTPS route via the externally facing web proxy. When the Client is ready to open a media channel, it identifies itself to the TURN server 1026 using this Token and then sends media via the TURN, Kandy-Link Brokers 1062 and the SBC 1060 to the far-end device.

The various nodes each perform additional integrity checking along the path: TURN only allows certain packet modes and destinations. Kandy-Link Brokers 1062 only accept traffic that is established with DTLS-SRTP using keys that have been shared over the protected signalling channels. SBCs 1060 perform media integrity checking on the RTP streams.

If the other party on the call is a Cisco phone, for example, a SeeMe conference or an external party on the PSTN, the call signalling and media may transit the Session Border Controllers (SBCs) 1060 to reach them. In this exemplary illustration, calls will hairpin through the SBCs 1060, even if the call is between two ConnectMe-BYOD clients on the same Kandy infrastructure. If one of the parties on the call is a recorded user, then the SBC may use SIPRec to invoke a Call-Recording platform; sending it an XML file that contains relevant metadata about the call and a copy of the audio media stream. If the recorded party is calling from a Cisco phone and is talking to someone who is using ConnectMe, then this call may be sent to the call recorders 1064 by both the Cisco and the ConnectMe infrastructure. Other implementations with varying services and products may be used in accordance with the various embodiments of the present invention. FIG. 10A-B illustrate one exemplary embodiment for illustration purposes. Accordingly, the embodiments of the present invention are not limited to the illustration of FIGS. 10A and B.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a soft phone interaction, the system comprising:
    a centralized framework that delivers API driven communication capabilities and micro-services;
    a set of communications clients to deliver a plurality of communication and collaboration tools across a plurality of disparate devices associated with a plurality of different employees of an entity; and
    a computer processor, coupled to the centralized framework and the set of communication clients, configured to perform the steps of:
    receiving a request for communication at an input interface;
    determine if the request is originating from an employee associated with the entity;
    determine, upon verifying the request is from an employee associated with the entity, whether the request is originating from (1) a first personal device not issued from the entity or an entity issued device and (2) an internal network managed and controlled by the entity or a network external to entity;

upon determining the request is originating from the first personal device and not from the internal network managed and controlled by the entity:

conduct a first authentication of the employee and first personal device through physical security as a service at a tier 1 demilitarized zone via one or more of a single sign-on and Active Directory Federation Services; and upon first authentication, transfer the communication request to a tier 2 internal web server where an internal secondary authentication of the employee and first personal device is performed via one or more of a local user accounts service and a directory service that manages a plurality of devices, the first and second authentications comprising a complete authentication;

upon determining the request is originating from the internal network managed and controlled by the entity, authenticate the employee at a tier 3 internal web server via one or more of a local user accounts service and a directory service that manages a plurality of devices, this authentication also comprising the complete authentication;

upon complete authentication, connecting, via an api interface of the centralized framework, the request for communication to a recipient, wherein the recipient and the employee are employed by the entity; and directing, via a call manager, the request for communication to a second device from a plurality of devices associated with the recipient wherein the first device is different in type and model from the second device;

wherein the centralized framework is infrastructure and vendor agnostic and the plurality of communication and collaboration tools are executed in a uniform and consistent manner across the first device and the second device.

2. The system of claim 1, wherein the request is authenticated and registered through an API framework connection.

3. The system of claim 1, wherein the request for communication is received by Physical Security as a Service (PSaaS) component.

4. The system of claim 1, wherein at least one of the first device and the second device communicates via a web server associated with a Tier 3/Internal layer to the centralized framework.

5. The system of claim 1, wherein at least one of the first device and the second device communicates via the Internet and Tier 1/DMZ layer.

6. The system of claim 1, wherein the centralized framework accesses an entity's internal directory.

7. The system of claim 1, wherein the centralized framework communicates with a Tier 2 layer via a cloud communications platform.

8. The system of claim 1, wherein the plurality of communication and collaboration tools comprise video conferencing, unified enterprise communication and team collaboration.

9. The system of claim 1, wherein at least one of the first device and the second device interacts with virtual representations of one or more hardware peripheral devices.

10. The system of claim 1, wherein the centralized framework is coupled to a personal virtual assistant application that communicates with one or more end users.

11. A method that implements a soft phone interaction, the method comprising the steps of:

receiving, at a centralized framework, a request for communication at an input interface, wherein a centralized framework that delivers API driven communication capabilities and micro-services and provides a set of communications clients to deliver a plurality of communication and collaboration tools across a plurality of disparate devices associated with a plurality of different employees of an entity;

determining if the request for communication is originating from an employee associated with the entity;

determining, upon verifying the request is from an employee associated with the entity, whether the request is originating from (1) a first personal device not issued from the entity or an entity issued device and (2) an internal network managed and controlled by the entity or a network external to entity;

upon determining the request is originating from the first personal device and not from the internal network managed and controlled by the entity:

conducting a first authentication of the employee and first personal device through physical security as a service at a tier 1 demilitarized zone via one or more of a single sign-on and Active Directory Federation Services; and transferring, upon first authentication, the communication request to a tier 2 internal web server where an internal secondary authentication of the employee and first personal device is performed via one or more of a local user accounts service and a directory service that manages a plurality of devices, the first and second authentications comprising a complete authentication;

upon determining the request is originating from the internal network managed and controlled by the entity, authenticating the employee at a tier 3 internal web server via one or more of a local user accounts service and a directory service that manages a plurality of devices, this authentication also comprising the complete authentication;

connecting, upon complete authentication and via an api interface of the centralized framework, the request for communication to a recipient, wherein the recipient and the employee are employed by the entity; and directing, via a call manager, the request for communication to a second device from a plurality of devices associated with the recipient wherein the first device is different in type and model from the second device;

wherein the centralized framework is infrastructure and vendor agnostic and the plurality of communication and collaboration tools are executed in a uniform and consistent manner across the first device and the second device.

12. The method of claim 11, wherein the request is authenticated and registered through an API framework connection.

13. The method of claim 11, wherein the request for communication is received by Physical Security as a Service (PSaaS) component.

14. The method of claim 11, wherein at least one of the first device and the second device communicates via a web server associated with a Tier 3/Internal layer to the centralized framework.

15. The method of claim 11, wherein at least one of the first device and the second device communicates via the Internet and Tier 1/DMZ layer.

16. The method of claim 11, wherein the centralized framework accesses an entity's internal directory.

17. The method of claim 11, wherein the centralized framework communicates with a Tier 2 layer via a cloud communications platform.

18. The method of claim 11, wherein the plurality of communication and collaboration tools comprise video conferencing, unified enterprise communication and team collaboration.

19. The method of claim 11, wherein at least one of the first device and the second device interacts with virtual representations of one or more hardware peripheral devices.

20. The method of claim 11, wherein the centralized framework is coupled to a personal virtual assistant application that communicates with one or more end users.

\* \* \* \* \*